United States Patent [19]

Bocchiola

[11] Patent Number: 5,577,153
[45] Date of Patent: Nov. 19, 1996

[54] HIGH FREQUENCY CONTROL CIRCUIT FOR DC MOTORS, PARTICULARLY FOR WASHING MACHINES

[75] Inventor: Cesare A. Bocchiola, Settimo Milanese, Italy

[73] Assignee: Whirlpool Europe B.V., Veldhoven, Netherlands

[21] Appl. No.: 378,034

[22] Filed: Jan. 24, 1995

[30] Foreign Application Priority Data

Jan. 25, 1994 [IT] Italy .................................. MI94A0115

[51] Int. Cl.$^6$ ...................................................... H02P 5/17
[52] U.S. Cl. ....................... 388/811; 388/906; 388/907.5; 318/438; 318/246
[58] Field of Search ..................................... 318/438, 729, 318/246–252, 798–811; 388/809–824, 906

[56] References Cited

U.S. PATENT DOCUMENTS

| | | | |
|---|---|---|---|
| 3,887,852 | 6/1975 | Fernandes et al. | 318/732 X |
| 4,788,485 | 11/1988 | Kawagishi et al. | 318/811 |
| 5,119,283 | 6/1992 | Steigerwald et al. | 363/37 |
| 5,426,754 | 6/1995 | Bausch | 318/254 |

FOREIGN PATENT DOCUMENTS

| | | | |
|---|---|---|---|
| 56-0122961 | 8/1981 | Japan | H02P 7/28 |
| 0058502 | 3/1992 | Japan | H02P 6/02 |

OTHER PUBLICATIONS

Patent Abstracts of Japan, vol. 7 No. 103(E–173) 6 May 1983, JP-A-58 026 587 (Hitachi Seisakusho K.K.) May 1983.

Patent Abstrcacts of Japan, vol. 18 No. 29 (E–1492), JP-A-52-060-787 (Isao Takahashi) Jan. 1994.

Digital Power Factor Correction with Non–Sinewave Current, 5th European Conference on Power Electronics and Applications, vol. 7, Guillemin et al., Sep. 1993.

5th European Conference on Power Electronics and Applications, vol. 7, Sep. 1993, Brighton, England pp. 176–182, XP000436185 P Guillemin et al. "Digital power factor correction with non–sinewave current" *p. 177, paragraph 2–p. 178*.

*Primary Examiner*—David S. Martin
*Attorney, Agent, or Firm*—Thomas A. Schwyn; Mark A. Davis

[57] ABSTRACT

A control circuit for a series type dc motor. The control circuit uses a switching cell to control motor speed. The switching cell and motor receive power from a filtered dc supply. A tachometer generator produces a voltage proportional to motor speed. The speed voltage is compared to a speed reference signal voltage and the difference is proportionally integrated to develop a speed error signal voltage. The speed reference signal voltage is developed at a summing node where a current generated by the control's microcontroller is summed with a current proportional to the input ripple voltage of the control's dc supply. The microcontroller also receives a voltage proportional to the control's dc input as a reference. The speed error signal voltage is compared with the output voltage of a current sensor that is in series with the motor feeder arrangement and the comparator's output is used to reset a bistable flip flop. The flip flop controls the switching cell and is set by a high frequency oscillator (100–150 khz). The cell closes when the flip flop is set and opens when the cell is reset. This control determines power absorbed by the motor and improves the motor power factor.

5 Claims, 2 Drawing Sheets

LEGEND: CURVE 1 - SPEED = 10,000 RPM
CURVE 2 - SPEED = 7,000 RPM
CURVE 3 - SPEED = 4,000 RPM

HIGH FREQUENCY CONTROL CIRCUIT FOR DC MOTORS, PARTICULARLY FOR WASHING MACHINES

BACKGROUND OF THE INVENTION

Field of the Invention

This invention relates to a circuit for controlling the rotational speed of direct current (dc) motors of series type, in particular domestic washing machine motors, by controlling at least one solid-state switch. Its function is to modify the ratio of the rectified line voltage to the voltage effectively applied to the motor by switching the solid-state switch. The circuit of the invention pertains to the category described in the introduction to the accompanying main claim.

Description of the Related Art

The topology of so-called voltage reduction switching cells (also known as bucking cells) is well known from the technical literature.

The method of controlling a dc electric motor by modulating the duty cycle of the high frequency input voltage to obtain a variable voltage across the motor is well known both in the literature and in the patent field (see for example DE-A-3221092, CH-A-647901 and international patent application WO88/00771). All the methods described therein use a solid-state switch connected directly in series with the dc motor using the motor inductance and the mechanical inertia of the load and motor as main filter of the switching cell configuration. This method has the considerable drawback that the switching frequency is necessarily limited by the interference emitted by the connection cables between the control circuit and the motor. This requires the use of radio frequency filters in order to satisfy existing regulations (principally in Europe), these filters being dimensionally large and costly.

The prior publications have considered various methods for controlling or limiting the current through the motor (see for example FR-A-70.21702, which states that the current "read" in a resistor in series with the motor can be used to form a current control loop) consisting of a conventional double loop system in which both the current signal (averaged through a switching period) and a voltage (or speed) signal from the motor are added or subtracted to obtain an overall reaction signal to be fed to a PWM (pulse width modulation) comparator.

Again, peak current mode control enables the current through the solid-state power switch to be controlled and limited, cycle by cycle, while at the same time providing a very rapid reaction to possible malfunctions and an effective current control, such as to "shape" the dynamic response of the switching cell. This control mode and its dynamic performance are well known in the literature for application to switching power feeders.

Power factor control techniques have also been recently described in the technical literature, sometimes in combination with average current and hysteresis control methods, these techniques however having found application to feeders for providing power factor control preregulators, followed by other conversion stages, and mainly for switching power feeders or continuity groups.

SUMMARY OF THE INVENTION

An object of the present invention is to jointly apply all the aforesaid techniques in a new and original manner to achieve overall control simultaneously offering the following: excellent dynamic response, very high switching frequency (between 100 and 150 kHz), very small radio frequency filters, very rapid and reliable action against overloads, and a very good input power factor in the ac feed line.

A further object is to provide a new and simple means for measuring the power absorbed by a dc motor in order to sense mechanical load unbalance conditions on the motor, particularly during the spin stage of a washing machine. This derives from the fact that the effective parameter able to influence the mechanical stability of the washing machine is the power which the motor provides to the washing machine drum.

These and further objects which will be more apparent from the detailed description given hereinafter are attained by a control circuit in accordance with the accompanying claims.

BRIEF DESCRIPTION OF THE DRAWINGS

The invention will be more apparent from the detailed description of a preferred embodiment thereof given hereinafter with reference to the accompanying drawing, in which.

DESCRIPTION OF THE PREFERRED EMBODIMENT

Figure 1:
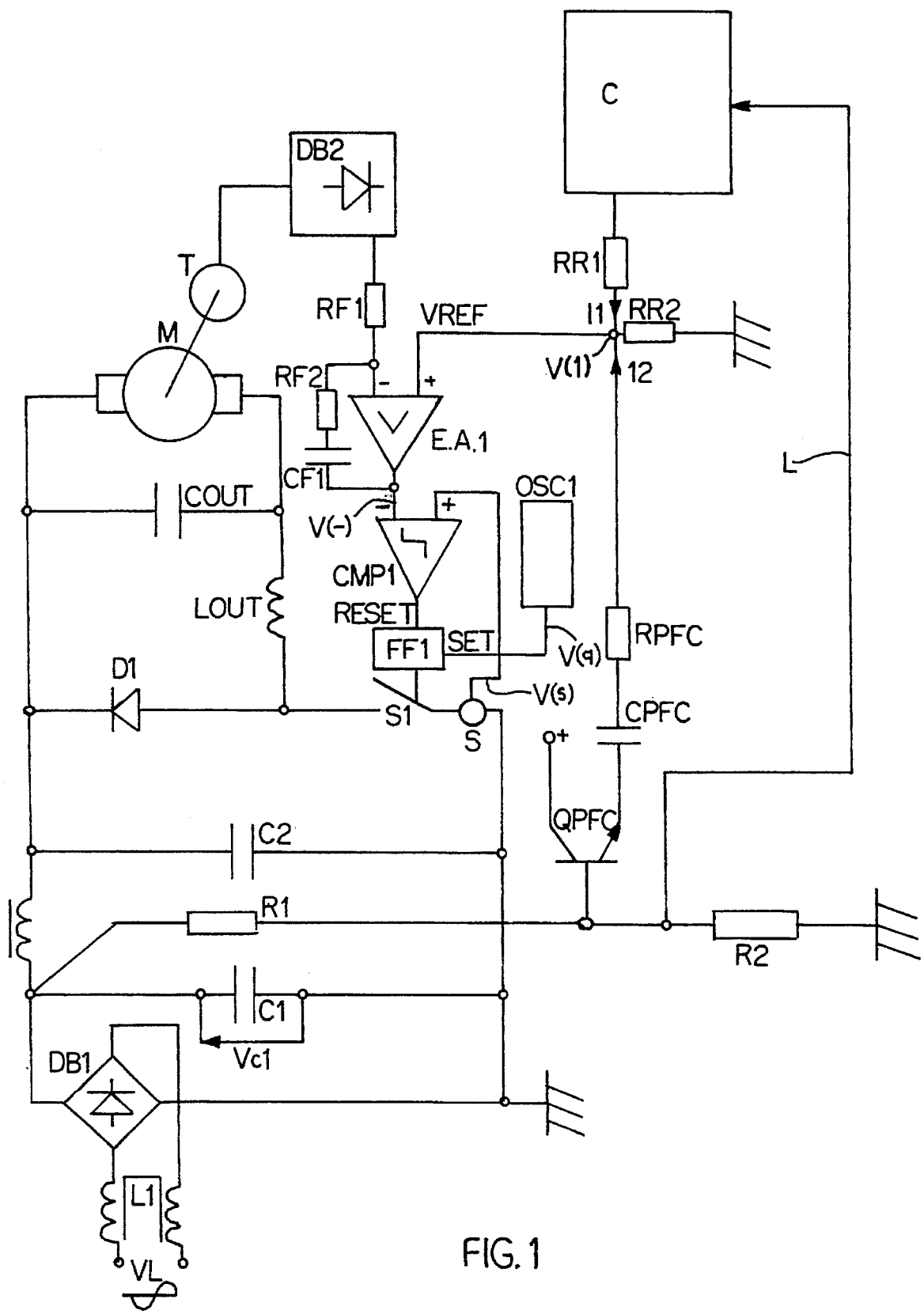
FIG. 1 shows the control circuit.

With reference to FIG. 1, the line voltage $V_L$ is rectified by a rectifier bridge DB1. At the output of the bridge DB1 there is a $\pi$ filter formed from an inductance L2 and two low capacitance capacitors C1, C2.

Downstream of said filter there are a flywheel diode D1, a solid-state switch S1 (which for reasons of simplicity is represented by its equivalent symbol) in series with which there is a current sensor (for example a resistor). Between the diode D1, switch S1 and motor M there is connected an inductance Lout in series with the dc motor M (of series type). In parallel with the motor M there is connected a capacitor Cout the purpose of which is to smooth the voltage applied to the motor M so as to reduce the interference emitted through the cables connecting the circuit to the motor.

The motor M drives the conventional drum (not shown) of a washing machine via a conventional belt and pulley transmission. A tachometer generator T is connected to the motor shaft to provide a voltage signal proportional to the motor speed. The signal from the generator T is rectified and filtered by a block DB2 to obtain a smoothed dc signal proportional to the speed of the motor M. This signal is fed via a resistor RF1 to the inverting input of an error amplifier EA1 provided with proportional-integral compensation represented by the said resistor RF1 and the series feedback network consisting of the resistor RF2 and the capacitor CF1. The purpose of the compensation is to achieve good static speed regulation. A reference signal VREF originating from the adder node 1, discussed hereinafter, is applied to the non-inverting input of the error amplifier EA1. The amplified error signal, resulting from the difference between the inputs and output of the error amplifier EA1, defines the maximum peak current level in the solid-state switch S1.

The reference signal VREF is the voltage drop across a resistor RR2 connected to earth, and is obtained by adding together at the mode 1 the current provided by a microcontroller C via a resistor RR1, and the current I2 reaching said node via a transistor QPFC, a high-capacitance capacitor CPFC and a resistor RPFC. The transistor base is connected to the intermediate point of a resistive voltage divider R1, R2 connected in parallel with the output of the rectifier bridge DB1.

Figure 3:
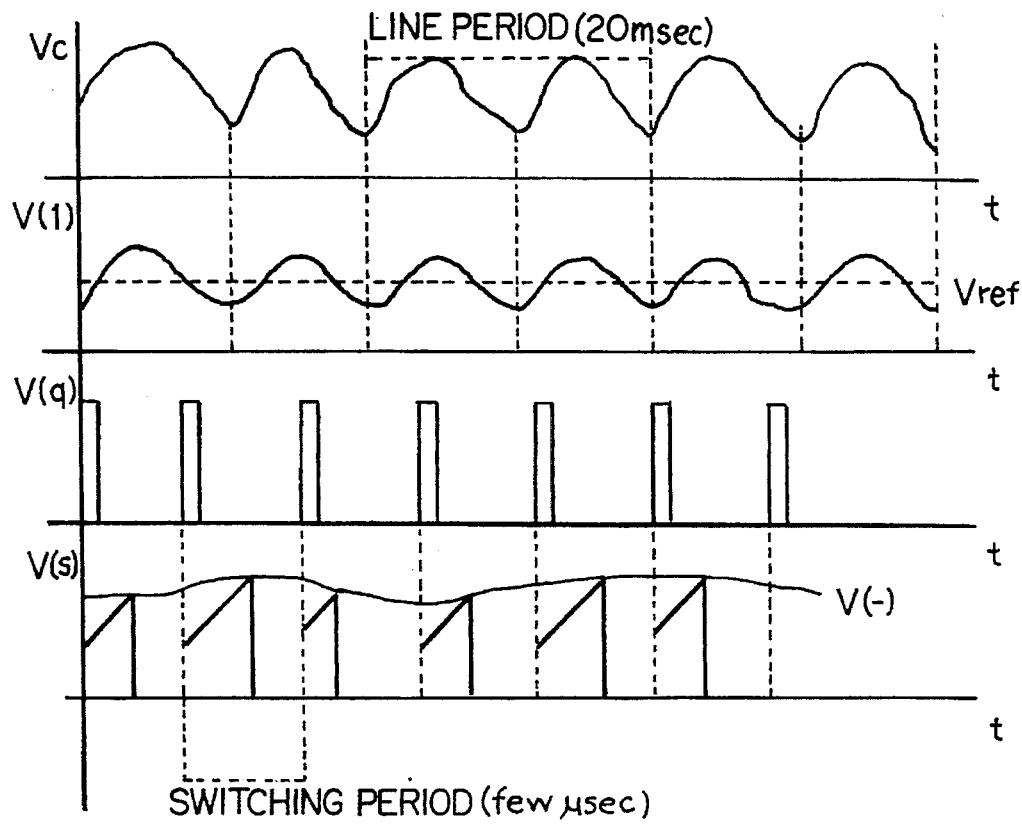
FIG. 3 shows the variation in the voltage signals against time at the points indicated in FIG. 1.

The current I1 provided by the microcontroller C is proportional to the reference speed whereas the current I2 is the image of the output voltage (VC1, see FIG. 3) of said bridge.

As the capacitance of the capacitors C1 and C2 is very low, their reactance is high and the voltage VC1 and hence the current passing through the voltage divider R1, R2 are signals which, although rectified, have a ripple component of double the line frequency and in phase with it. The current I2 therefore represents the ripple component as the function of the capacitor CPFC is to provide only ac coupling. As the capacitance of this capacitor is high it does not introduce a significant phase displacement. Consequently the reference signal VREF obtained across RR2 is modulated at double the line frequency (if the line frequency is 50 Hz, this frequency will be 100 Hz).

In addition, with a view to achieving correct depth of modulation, necessary for good power factor correction, the said resistor RPFC is provided, this advantageously being adjustable during the setting-up of the circuit.

An access line L to the microcontroller C is connected to the intermediate point of the voltage divider.

From the aforegoing it will be noted that the relative output signal of the error amplifier EA1 is also modulated at double the line frequency, as the network formed by the components CF1 and RF2 is sized so as not to substantially filter this frequency component.

This output signal is applied to the inverting input of a comparator CMP1, to the non-inverting input of which there is applied a signal representative of the current passing through the solid-state switch S1 and measured by the current sensor S, this current having an approximately sawtooth shape.

The output of the comparator CMP1 is applied for reset purposes to one of the inputs of the double-drive flip-flop FF1, the other input of which is driven by the pulse signal (approximating to Dirac delta) on the basis of the setting signal, $V_{(q)}$, generated by an oscillator OSC1 of fixed oscillation frequency between 100 and 150 kHz.

In this manner the switch S1 is "closed" at fixed frequency, whereas it is "opened" when the current passing through it attains the value present at the output of the error amplifier EA1. Consequently the peak current through the static switch S1 is controlled and limited cycle by cycle.

As stated, the output of the error amplifier EA1 is modulated at double the line frequency, the peak current through the switch S1 is also likewise modulated. In addition, as the peak current through the switch S1 is strictly proportional to the line current, it can be concluded that this latter is exactly modulated at double the line frequency. However because of the existence of the rectifier bridge DB1, the current absorbed by the line is exactly sinusoidal and in phase with the line voltage, with the result that a very high power factor is obtained.

The reduction function of the circuit of the invention derives from the fact that each time the static S1 closes, the inductance Lout is charged to then discharge via the flywheel diode D1 when the switch opens. In this manner controlled quantities of energy are supplied to the motor M at each switching cycle. It should be noted that, as stated, the purpose of the capacitor Cout is merely to smooth the voltage applied to the motor, so reducing interference radiated through the connection cables between the circuit and the motor M.

The function of "reading" (by means of S) the current passing through the static switch S1 and applying this "reading" to the comparator CMP1 forms an internal peak current control loop. The function of "reading" the tachometer signal, filtering it, subtracting it from the variable reference signal (VREF) and controlling the internal peak current control loop by the obtained signal such that the switching of the static switch provides a controlled voltage across the motor M and hence a certain speed read by the tachometer T, forms an external speed control loop. On this basis, it can be stated that the internal peak current control loop provides another important function, ie to correct the behavior of the switching cell (S1, D1, Lout, Cout) at low signals so that a first order gain is obtained. The result is that the overall dynamic performance of the control circuit of the invention is very good.

An inductance L1 is advantageously positioned in the feed line across the input terminals of the rectifier bridge DB1 in order, together with the components C1, C2 and L2 positioned downstream of the bridge, to reduce radio frequency emission along the feed line, however the said filtering components are small and of low cost because of the 100–150 kHz frequency operation.

It should be noted that at very low loads, ie with the motor M operating with very low torque, the capacitors C1 and C2, even if very small, are sufficient to smooth the output voltage of the rectifier bridge DB1 such that in practice the voltage across their ends (eg. VC1) is a smoothed dc voltage.

With increase in the load of the motor M and hence in the average current absorbed by the circuit, the ripple voltage across the capacitors C1 and C2 increases such that at full load this voltage is practically the rectified but unsmoothed voltage.

Figure 2:
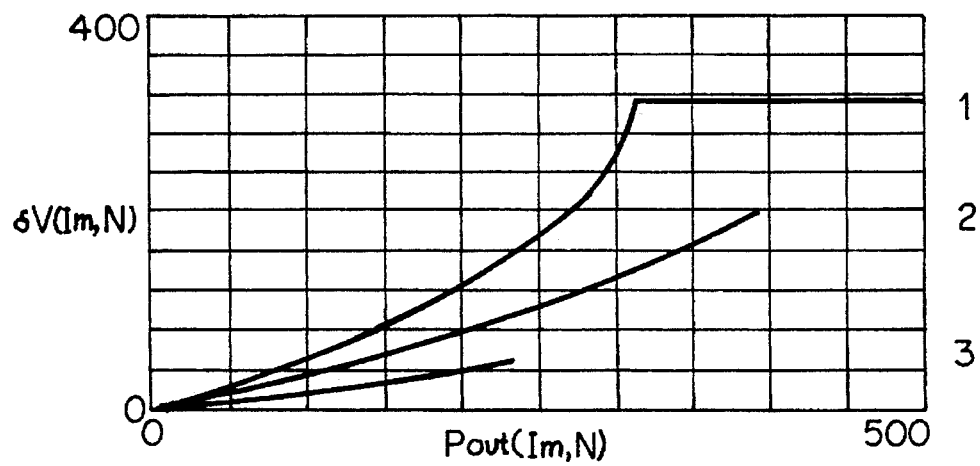
FIG. 2 shows the variation in the ripple component of the rectified voltage against motor absorbed power for different constant rpm values.

FIG. 2 shows how the amplitude of the ripple component is related to the power absorbed by the motor. In this figure the horizontal axis indicates the power applied to the motor M and the vertical axis indicates the voltage ripple ($\delta V$) across the capacitor C1. The curves each relate to a given indicated motor rpm. It can be seen that as the applied power and hence the load increases, the $\delta V$, ie the ripple voltage, increases for equal motor rpm. It can also be seen that for equal rpm the ripple voltage $\delta V$ increases with increasing power, ie is related to the motor absorbed power.

This behavior is particularly useful during the washing machine spinning stage when the voltage applied to the motor approximates to the average line voltage (ie the voltage conversion ratio of the described reduction circuit approximates to one), while the current absorbed by the motor is relatively small. If the load of clothes in the drum is unbalanced, the mechanical power required from the motor increases, resulting in an increase in current absorbed by the motor. This produces an increase in ripple voltage across the capacitor C1, this increase being "measured" by the resistive voltage divider R1, R2 and fed to the microcontroller C. The microcontroller C then acts on the output current I1, varying the reference voltage in such a manner as to reduce the motor speed, so limiting the average voltage applied to the motor.

In place of the microcontroller C a simple dc energy source, possibly presettable, can be provided if it is not required to make the reference voltage also dependent on controlling the unbalance of the washing machine load.

We claim:

1. A control circuit for a series type dc motor, a type of motor used in washing machines to drive a drum via a mechanical transmission, comprising:

a rectifier circuit with an input and an output, said input is connected to a power feed line;

a switching cell for controlling motor speed;

a tachometer generator for measuring said motor speed and producing a speed voltage proportional to said speed;

an error amplifier means with proportional-integral regulator for comparing said speed voltage with a reference signal to produce an error signal;

a second comparator means for comparing said error signal with a current signal to produce an output signal;

a current sensor connected in series with said motor and generating said current signal;

said output signal of said second comparator means drives said switching cell, wherein said switching cell comprises:
a switching means in series with said motor;
an inductance connected between said switching means and said motor;
and a capacitor connected in parallel with said motor;

said switching cell is controlled by a double-drive bistable circuit;

a first drive of the bistable circuit is controlled by said output signal of said second comparator means for resetting purposes;

an oscillator for controlling a second drive of said bistable circuit for setting purposes;

said second comparator means compares said output signal of said error amplifier with said current signal that is proportional to the current through said switch means;

a capacitive-inductive $\pi$ filter is connected at said output of said rectifier in parallel with the motor;

a voltage divider circuit is connected at said output of said rectifier, said voltage divider comprising a first and second resistor connected in series;

an ac coupling means coupling a signal from a common connection of said first and second voltage divider resistors with said reference voltage input of said error amplifier; and a flywheel diode is included within the switching cell to feed said motor with energy stored in said inductance when said switching means is switched to an open position during operation of said motor.

2. A circuit as claimed in claim 1, further comprising at least one inductance connected into the power feed line.

3. A circuit as claimed in claim 2, wherein said reference voltage derives from a voltage drop across a resistor connected to earth, from the sum of two currents, one deriving from said ac coupling means signal, the other from a voltage source for improving the power factor.

4. A circuit as claimed in claim 3, wherein the voltage source comprises a microcontroller having an input connected to said common connection of said first and second voltage divider resistors, for the purpose of reading a voltage fluctuation across a capacitor of said $\pi$ filter and using said voltage fluctuation to determine power absorbed by said motor.

5. A circuit as claimed in claim 1 wherein said reference voltage derives from a voltage drop across a resistor connected to earth, from the sum of two currents, one deriving from said ac coupling means signal, the other from a voltage source for improving the power factor.

* * * * *